(12) United States Patent
Ye

(10) Patent No.: US 11,176,394 B2
(45) Date of Patent: Nov. 16, 2021

(54) FACE IMAGE PROCESSING METHOD AND DEVICE

(71) Applicant: ULSee Inc., Taipei (TW)

(72) Inventor: Zhou Ye, Taipei (TW)

(73) Assignee: ULSee Inc., Taipei (TW)

( * ) Notice: Subject to any disclaimer, the term of this patent is extended or adjusted under 35 U.S.C. 154(b) by 0 days.

(21) Appl. No.: 16/822,221

(22) Filed: Mar. 18, 2020

(65) Prior Publication Data

US 2020/0349406 A1 Nov. 5, 2020

Related U.S. Application Data

(60) Provisional application No. 62/842,666, filed on May 3, 2019.

(51) Int. Cl.
*G06K 9/00* (2006.01)
*G06K 19/06* (2006.01)

(52) U.S. Cl.
CPC ..... *G06K 9/00926* (2013.01); *G06K 9/00255* (2013.01); *G06K 9/00268* (2013.01); *G06K 9/00288* (2013.01); *G06K 19/06037* (2013.01); *G06K 19/06103* (2013.01); *G06K 2009/00953* (2013.01)

(58) Field of Classification Search
CPC ........... G06K 9/00281; G06K 9/00288; G06N 3/0454; G06N 3/084
USPC ....... 235/494, 462.1, 462.11, 462.24, 462.25
See application file for complete search history.

(56) References Cited

U.S. PATENT DOCUMENTS

| | | | |
|---|---|---|---|
| 6,954,549 B2 | 10/2005 | Kraft | |
| 7,039,222 B2 | 5/2006 | Simon et al. | |
| 7,257,271 B2 | 8/2007 | Adams, Jr. et al. | |
| 7,336,842 B2 * | 2/2008 | Kondo | G06K 9/00275 235/380 |
| 7,623,707 B2 | 11/2009 | Brandt | |
| 8,295,557 B2 | 10/2012 | Wang et al. | |
| 2003/0121710 A1 * | 7/2003 | Hamada | B60R 21/0136 180/274 |
| 2005/0238209 A1 * | 10/2005 | Ikeda | G06K 9/00248 382/118 |
| 2013/0063424 A1 * | 3/2013 | Ueki | H04N 13/261 345/419 |
| 2015/0206030 A1 * | 7/2015 | Sultana | G06K 9/00228 382/118 |
| 2016/0371535 A1 * | 12/2016 | Li | G06K 9/00288 |
| 2017/0004353 A1 * | 1/2017 | Tang | G06K 9/6232 |
| 2017/0039418 A1 * | 2/2017 | Wang | G06K 9/00288 |
| 2018/0189550 A1 * | 7/2018 | McCombe | G06K 9/00208 |
| 2019/0311183 A1 * | 10/2019 | Wang | G06K 9/6268 |

* cited by examiner

*Primary Examiner* — Daniel St. Cyr
(74) *Attorney, Agent, or Firm* — Karin L. Williams; Alan D. Kamrath; Mayer & Williams PC

(57) ABSTRACT

A face image processing method is provided. The face processing method comprising: extracting a plurality of features from a primary two-dimensional face image to generate a first feature vector; decomposing a three-dimensional face image into a plurality of base face images and a plurality of weighting factors corresponding to the base face images; generating a first two-dimensional code according to the first feature vector; and generating a second two-dimensional code according to the weighting factors.

6 Claims, 8 Drawing Sheets

FACE IMAGE PROCESSING METHOD AND DEVICE

FIELD OF THE INVENTION

The present disclosure relates to a face image processing method and device, in particular, to a face image processing method and device for recording information representing an image in a two-dimensional code.

BACKGROUND OF THE INVENTION

Face recognition technology actually uses the high-speed infrared of the lens to capture three-dimensional face details such as face shape and texture. The users don't need to stay too long; their face information can be recognized by walking past the camera normally. The system is quite accurate, it can distinguish pores, wrinkles and spots in detail; making heavy makeup, having acne and even twins may not troubles for the recognition system.

In addition, the application of face recognition technology starts from railway stations and airports, and also extends to hotel accommodations, bank withdrawals, and even cans of beer, so that our faces will become the keys to open various life scenarios.

The information can automatically pop up on the screen only by shooting people or things, which sounds very convenient and saves the trouble of searching. However, if used by others, knowing a person's name, age, occupation, background, and phone number with a single photo is actually problematic. Specifically, the face is the most iconic feature of a person. If the face is exposed, all privacy will no longer exist.

Therefore, how to prevent the privacy of the user from being exposed in the case of applying face recognition technology is that those skilled in the art are worth considering.

SUMMARY OF THE INVENTION

In order to solve the above-mentioned problems, the technical scheme adopted by the present invention is as follows.

A face image processing method is provided. The face processing method comprising: extracting a plurality of features from a primary two-dimensional face image to generate a first feature vector; decomposing a three-dimensional face image into a plurality of base face images and a plurality of weighting factors corresponding to the base face images; generating a first two-dimensional code according to the first feature vector; and generating a second two-dimensional code according to the weighting factors.

Furthermore, the method comprises extracting a plurality of features from a secondary two-dimensional face image to generate a second feature vector, wherein when a distance difference between the first feature vector and the second feature vector is less than a set value, the primary two-dimensional face image and the secondary two-dimensional face image are from different states of the same face.

Furthermore, the base face images comprise a first base face image and a second base face image, the weighting factors comprise a first weighting factor and a second weighting factor, and the three-dimensional face image is generated by multiplication of the first base face image and the first weighting factor plus multiplication of the second base face image and the second weighting factor.

Furthermore, a face image processing device is provided. The face processing method comprising: an image information capture unit, extracting a plurality of features from a primary two-dimensional face image to generate a first feature vector; a three-dimensional morphable model unit, decomposing a three-dimensional face image into a plurality of base face images and a plurality of weighting factors corresponding to the base face images; and a two-dimensional code generation unit, generating a first two-dimensional code according to the first feature vector, and generating a second two-dimensional code according to the weighting factors.

Furthermore, the image information capture unit extracts a plurality of features from a secondary two-dimensional face image to generate a second feature vector, wherein when a distance difference between the first feature vector and the second feature vector is less than a set value, the primary two-dimensional face image and the secondary two-dimensional face image are from different states of the same face.

Furthermore, the base face images comprise a first base face image and a second base face image, the weighting factors comprise a first weighting factor and a second weighting factor, and the three-dimensional face image is generated by multiplication of the first base face image and the first weighting factor plus multiplication of the second base face image and the second weighting factor.

DESCRIPTION OF THE PREFERRED EMBODIMENTS

Figure 1A:
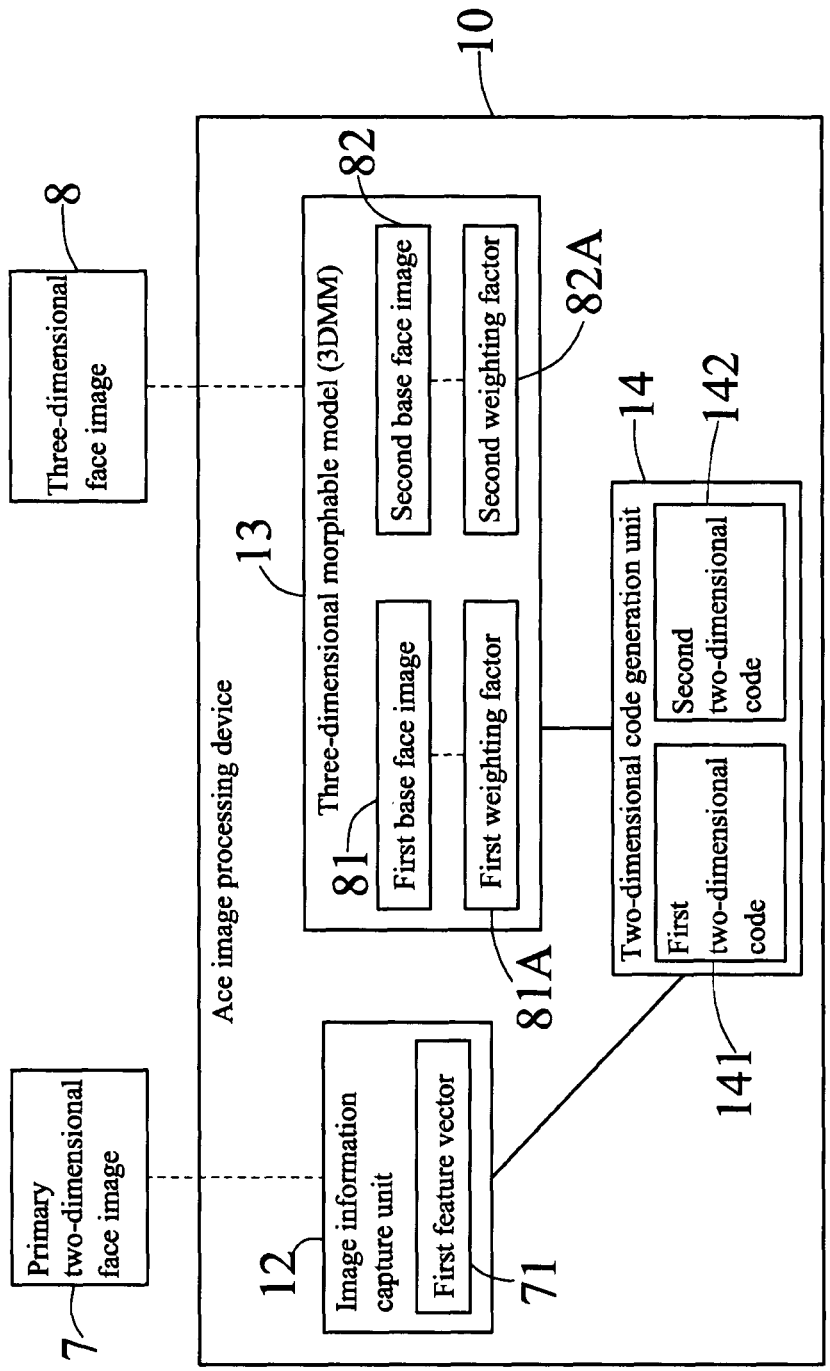
FIG. 1A illustrates a view showing a face image processing device 10 and an external two-dimensional face image 7 and a three-dimensional face image 8 in the present embodiment.

The following invention provides many different embodiments, or examples, for implementing different features of the provided subject matter. Specific examples of components and arrangements are described below to simplify the present invention. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present invention may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1B:
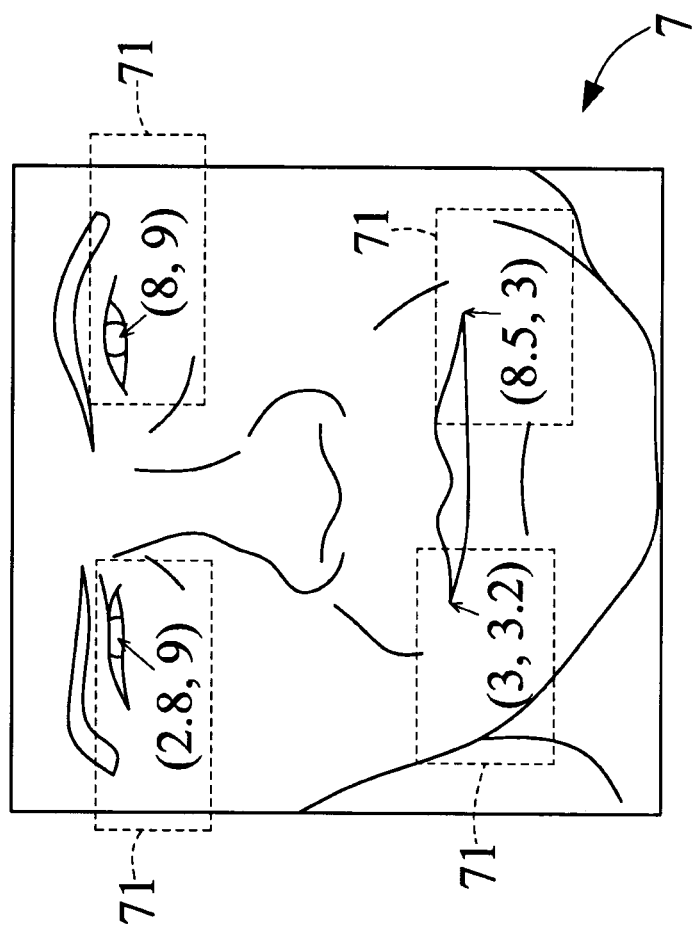
FIG. 1B illustrates a view showing extracting features from the two-dimensional face image to generate a first feature vector.

With reference to FIG. 1A, FIG. 1A illustrates a view showing a face image processing device 10 and an external two-dimensional face image 7 and a three-dimensional face image 8 in the present embodiment. FIG. 1B illustrates a view showing extracting features from the two-dimensional face image to generate a first feature vector. The face image processing device 10 includes an image information capture unit 12, a three-dimensional morphable model (3DMM) 13 and a two-dimensional code generation unit 14. Among them, the image information capture unit extracts a plurality of features from a primary two-dimensional face image 7 to generate a first feature vector 71. For example, the primary two-dimensional face image 7 is characterized by the pupils of both eyes and the corners of the lips, wherein the coordinates of the two eyes are (2.8, 9) and (8, 9), and the coordinates of the corners of the face are (3, 3.2) and (8.5, 3), which are all belong to the first feature vector 71 of the primary two-dimensional face image 7.

Figure 1C:
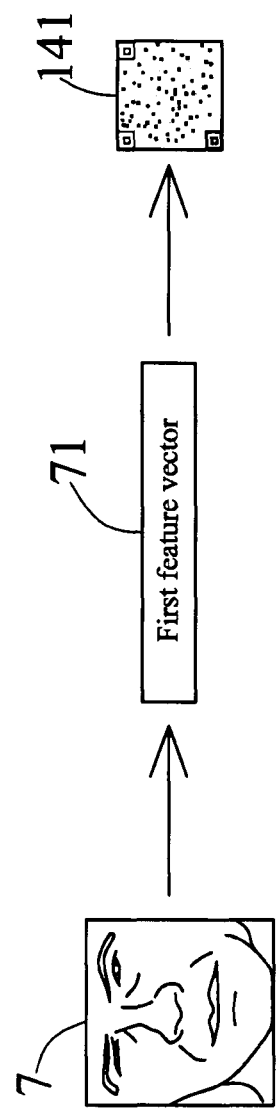
FIG. 1C illustrates a view showing converting the primary two-dimensional face image 7 into a first two-dimensional code 141.

With reference to FIG. 1C, FIG. 1C illustrates a view showing converting the primary two-dimensional face image 7 into a first two-dimensional code 141. The two-dimensional code generation unit generates a first two-dimensional code 141 according to the first feature vector 71, that is, the position coordinates of the plurality of features of the primary two-dimensional face image 7 are stored in the first two-dimensional code 141. In this way, since the first two-dimensional code 141 is transformed from the primary two-dimensional face image 7, the first two-dimensional code 141 also retains the uniqueness and recognizability of the face. Thus, the first two-dimensional code 141 may replace the primary two-dimensional face image 7 as a key to open various scenarios without exposing face features, so the device may prevent the privacy of the device from being exposed when the face recognition technology is applied.

In the above description, usually, in the process of converting into the first two-dimensional code 141, the first feature vector 71 is also encrypted, so the first two-dimensional code 141 may not be restored to the primary two-dimensional face image 7 without being decrypted. Therefore, even if the first two-dimensional code 141 is obtained by other people, the face image processing device 10 also reduces the risk of theft of face features.

Figure 2A:
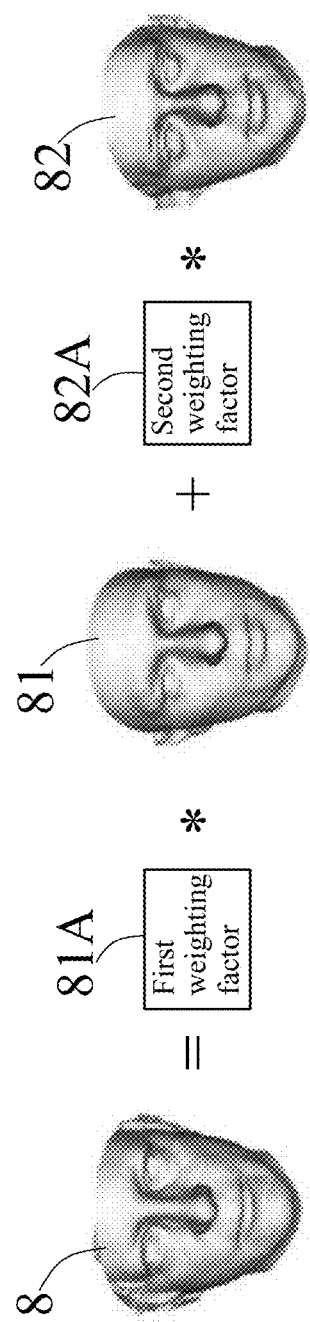
FIG. 2A illustrates a view showing generating the three-dimensional face image 8 by combining base face images with weighting factors.

With continuous reference to FIG. 1A and also FIG. 2A, FIG. 2A illustrates a view showing generating the three-dimensional face image 8 by combining base face images with weighting factors. The three-dimensional morphable model unit 13 is configured to decompose a three-dimensional face image into a plurality of base face images and a plurality of weighting factors corresponding to the base face images. In detail, the base face images include a first base face image 81 and a second base face image 82, while the weighting factors include a first weighting factor 81A and a second weighting factor 81B. And, the first weighting factor 81A is corresponding to the first base face image 81, and the second weighting factor 81B is corresponding to the second base face image 82.

Further, the original three-dimensional face image 8 is generated by multiplication of the first base face image 81 and the first weighting factor 81A plus multiplication of the second base face image 82 and the second weighting factor 82A. Therefore, the three-dimensional morphable model unit 13 may restore the three-dimensional face image 8 to the first base face image 81, the second base face image 82, the first weighting factor 81A, and the second weighting factor 81.

Figure 2B:
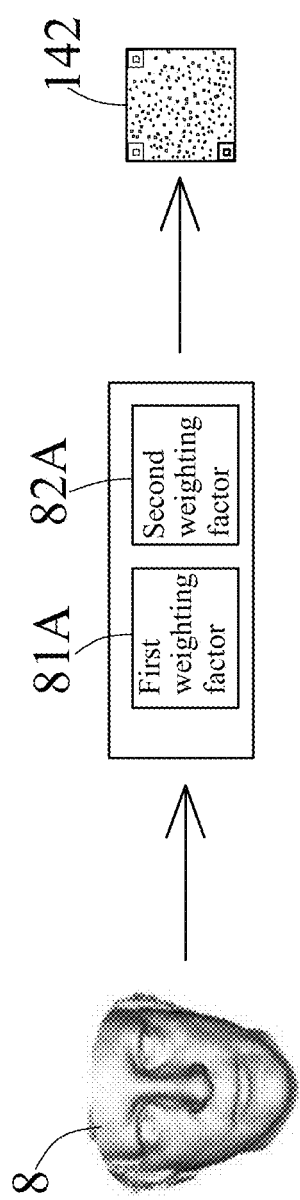
FIG. 2B illustrates a view showing converting the three-dimensional face image 8 into a second two-dimensional code 142.

With continuous reference to FIG. 1A and also FIG. 2B, FIG. 2B illustrates a view showing converting the three-dimensional face image 8 into a second two-dimensional code 142. The two-dimensional code generation unit may also generate the second two-dimensional code 142 according to the weighting factors (the first weighting factor 81A and the second weighting factor 81), i.e., storing the parameters of the weighting factors in the second two-dimensional code 142. In this way, since the combination of different weighting factors will produce different face shapes and the combination of the first weighting factor 81A and the second weighting factor 81 corresponds to the three-dimensional face image 8, the second two-dimensional code 142 also retains the uniqueness and recognizability of the stereo face. Thus, the second two-dimensional code 142 may replace the three-dimensional face image 8 as a key to open various scenarios without exposing face features, so the device may prevent the privacy of the device from being exposed when the face recognition technology is applied.

The first two-dimensional code 141 or the second two-dimensional code 142 includes a QR code, a High Capacity Color QR code, or a High Capacity Color Barcode (HCCB). The first two-dimensional code 141 or the second two-dimensional code 142 is replaced by a radio frequency identification passive tag (RFID passive tag). In detail, the position coordinates of the plurality of features of the primary two-dimensional face image 7 or the parameters of the weighting factors may also be stored in the radio frequency identification passive tag, so that the radio frequency identification passive tag is used as a key to open various scenarios.

Figure 3A:
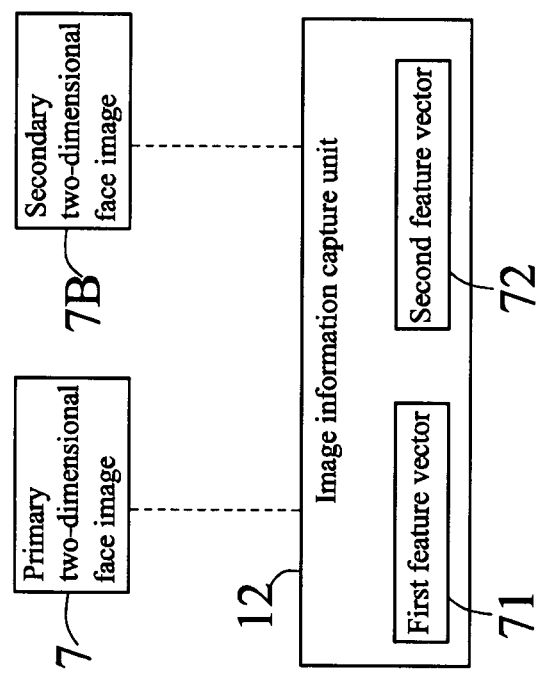
FIG. 3A illustrates a view of the image information capture unit 12, a primary two-dimensional face image 7 and a secondary two-dimensional face 7B.
Figure 3B:
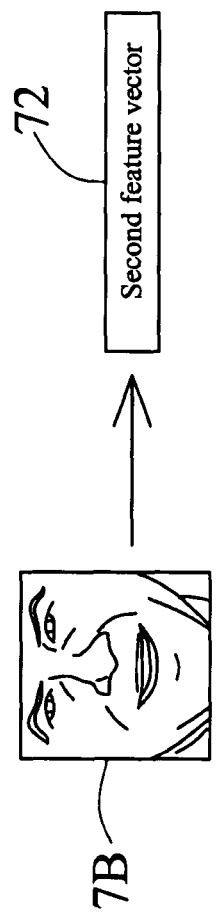
FIG. 3B illustrates a view showing the secondary two-dimensional face 7B corresponding to a second feature vector 72.

With continuous reference to FIG. 3A and FIG. 3B, FIG. 3A illustrates a view of the image information capture unit 12, a primary two-dimensional face image 7 and a secondary two-dimensional face 7B; FIG. 3B illustrates a view showing the secondary two-dimensional face 7B corresponding to a second feature vector 72. The image information capture unit 12 may, in addition to extracting a plurality of features from the primary two-dimensional face image 7 to generate the first feature vector 71, extract a plurality of features from a secondary two-dimensional face image 7B to generate a second feature vector 72. It should be noted that when a distance difference between the first feature vector 71 and the second feature vector is less than a set value, it is determined that the primary two-dimensional face image 7 and the secondary two-dimensional face image 7B are from different states of the same face. And, since it takes time to calculate the difference between two feature vectors using a computer but it is very fast to calculate the distance between two feature vectors, the primary two-dimensional face image 7 and the secondary two-dimensional face image 7B may be quickly determined whether they are from the same face.

Figure 4:
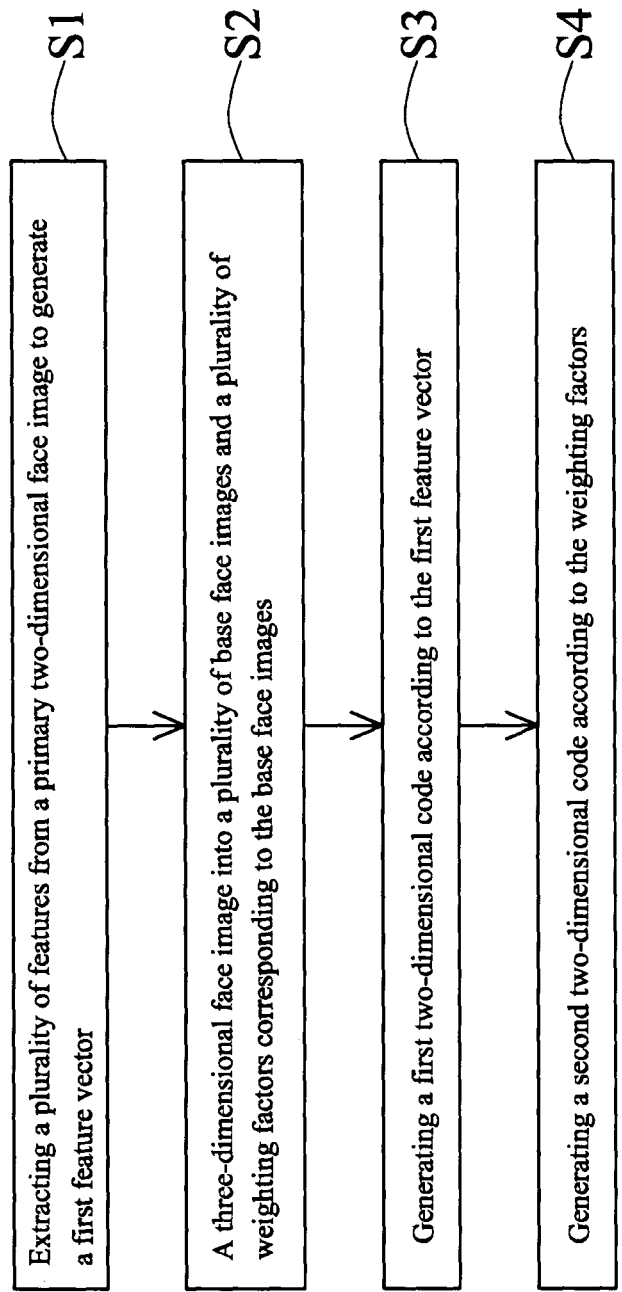
FIG. 4 illustrates a flow chart of a face image processing method according to an embodiment of the disclosure.

FIG. 4 illustrates a flow chart of a face image processing method according to an embodiment of the disclosure. The face image processing method of the present embodiment includes steps of: first, with reference to step S1 and also FIG. 1B, extracting a plurality of features from a primary two-dimensional face image 7 to generate a first feature vector 71;

then, with reference to step S2 and also FIG. 2A, decomposing a three-dimensional face image 8 into a plurality of base face images and a plurality of weighting factors corresponding to the base face images. In detail, the three-dimensional morphable model unit 13 may restore the three-dimensional face image 8 to the first base face image 81, the second base face image 82, the first weighting factor 81A, and the second weighting factor 81.

Next, the method includes: with reference to step S3 and also FIG. 1C, generating a first two-dimensional code 141 according to the first feature vector 71, i.e., storing the position coordinates of the plurality of features of the primary two-dimensional face image 7 in the first two-dimensional code 141.

Subsequently, the method includes: with reference to step S4 and also FIG. 2B, generating a second two-dimensional code 142 according to the weighting factors. In detail, the method includes generating the second two-dimensional code 142 according to the first weighting factor 81A and the second weighting factor 81B, i.e., storing the parameters of the first weighting factor 81A and the second weighting factor 81B in the second two-dimensional code 142.

It can be known through steps S1 to S4 that the position coordinates of the plurality of features of the primary two-dimensional face image 7 are stored in the first two-dimensional code 141, while the parameters of the weighting factors are stored in the second two-dimensional code 142. In this way, since the first two-dimensional code 141 is transformed from the primary two-dimensional face image 7, the first two-dimensional code 141 also retains the uniqueness and recognizability of the face. Thus, the first two-dimensional code 141 may replace the primary two-dimensional face image 7 as a key to open various scenarios without exposing face features. Further, since the combination of different weighting factors will produce different face shapes and the combination of the first weighting factor 81A and the second weighting factor 81 corresponds to the three-dimensional face image 8, the second two-dimensional code 142 also retains the uniqueness and recognizability of the stereo face. Thus, the second two-dimensional code 142 may replace the three-dimensional face image 8 as a key to open various scenarios without exposing face features, so the method may prevent the privacy of the device from being exposed when the face recognition technology is applied.

In summary, the face image processing method and device of the present disclosure may prevent the privacy of the face from being exposed when the face recognition technology is applied.

The above embodiments are merely examples for convenience of description. Although arbitrarily modified by those skilled in the art, these will not depart from the scope of protection as claimed in the claims.

What is claimed is:

1. A face image processing method, comprising:
   extracting a plurality of features from a primary two-dimensional face image to generate a first feature vector;
   extracting a plurality of features from a secondary two-dimensional face image to generate a second feature vector, wherein when a distance difference between the first feature vector and the second feature vector is less than a set value, the primary two-dimensional face image and the secondary two-dimensional face image are from different states of the same face;
   decomposing a three-dimensional face image into a plurality of base face images and a plurality of weighting factors corresponding to the base face images;
   generating a first two-dimensional code according to the first feature vector; and
   generating a second two-dimensional code according to the weighting factors;
   wherein the base face images comprise a first base face image and a second base face image, the weighting factors comprise a first weighting factor and a second weighting factor, and the three-dimensional face image is generated by multiplication of the first base face image and the first weighting factor plus multiplication of the second base face image and the second weighting factor.

2. The face image processing method according to claim 1, wherein the first two-dimensional code or the second two-dimensional code comprises a QR code, a High Capacity Color QR code, or a High Capacity Color Barcode (HCCB).

3. The face image processing method according to claim 1, wherein the first two-dimensional code or the second two-dimensional code is replaced by a radio frequency identification passive tag (RFID passive tag).

4. A face image processing device, comprising:
   an image information capture unit, extracting a plurality of features from a primary two-dimensional face image to generate a first feature vector, and extracting a plurality of features from a secondary two-dimensional face image to generate a second feature vector, wherein when a distance difference between the first feature vector and the second feature vector is less than a set value, the primary two-dimensional face image and the secondary two-dimensional face image are from different states of the same face;
   a three-dimensional morphable model unit, decomposing a three-dimensional face image into a plurality of base face images and a plurality of weighting factors corresponding to the base face images; and
   a two-dimensional code generation unit, generating a first two-dimensional code according to the first feature vector, and generating a second two-dimensional code according to the weighting factors;
   wherein the base face images comprise a first base face image and a second base face image, the weighting factors comprise a first weighting factor and a second weighting factor, and the three-dimensional face image is generated by multiplication of the first base face image and the first weighting factor plus multiplication of the second base face image and the second weighting factor.

5. The face image processing device according to claim 4, wherein the first two-dimensional code or the second two-dimensional code comprises a QR code, a High Capacity Color QR code, or a High Capacity Color Barcode (HCCB).

6. The face image processing device according to claim 4, wherein the first two-dimensional code or the second two-dimensional code is replaced by a radio frequency identification passive tag (RFID passive tag).

\* \* \* \* \*